United States Patent
Chuang

(10) Patent No.: US 11,253,748 B2
(45) Date of Patent: Feb. 22, 2022

(54) SCORING METHOD, EXERCISE SYSTEM, AND NON-TRANSITORY COMPUTER READABLE STORAGE MEDIUM

(71) Applicant: Lung-Fei Chuang, Taichung (TW)

(72) Inventor: Lung-Fei Chuang, Taichung (TW)

( * ) Notice: Subject to any disclaimer, the term of this patent is extended or adjusted under 35 U.S.C. 154(b) by 337 days.

(21) Appl. No.: 16/246,562

(22) Filed: Jan. 14, 2019

(65) Prior Publication Data
US 2019/0247716 A1    Aug. 15, 2019

(30) Foreign Application Priority Data
Feb. 12, 2018    (TW) .................................. 107105046

(51) Int. Cl.
    *A63B 24/00*    (2006.01)
    *G09B 19/00*    (2006.01)
    *G09B 5/02*    (2006.01)

(52) U.S. Cl.
    CPC ...... *A63B 24/0006* (2013.01); *A63B 24/0062* (2013.01); *G09B 5/02* (2013.01); *G09B 19/003* (2013.01); *G09B 19/0038* (2013.01); *A63B 2024/0068* (2013.01)

(58) Field of Classification Search
CPC ............ A63B 24/0006; A63B 24/0062; A63B 2024/0068; G09B 5/02; G09B 19/003; G09B 19/0038
See application file for complete search history.

(56) References Cited

U.S. PATENT DOCUMENTS

| | | | |
|---|---|---|---|
| 10,563,981 B1* | 2/2020 | Li | ........................... G01C 19/00 |
| 2005/0223799 A1* | 10/2005 | Murphy | ............... A61B 5/1124 |
| | | | 73/510 |
| 2006/0166737 A1* | 7/2006 | Bentley | ................ A61B 5/1124 |
| | | | 463/30 |

(Continued)

FOREIGN PATENT DOCUMENTS

| | | |
|---|---|---|
| CN | 103007514 A | 4/2013 |
| CN | 103942544 A | 7/2014 |

(Continued)

OTHER PUBLICATIONS

O'Rourke, C., & Madden, M. (2011). Activity Recognition based on Accelerometer Data using Dynamic Time Warping with Ensembles. Proceedings of AICS-2011, the 22nd Conference on Artificial Intelligence and Cognitive Science, Derry, Aug. 2011. (Year: 2011).*

(Continued)

*Primary Examiner* — Malina D. Blaise
(74) *Attorney, Agent, or Firm* — CKC & Partners Co., LLC

(57) ABSTRACT

A scoring method for an exercise system includes playing a course video and obtaining coach exercise data; obtaining learner exercise data by the wearable acceleration sensor; splitting the coach exercise data into multiple coach segments, in which each of the coach segments corresponds to multiple learner segments of the learner exercise data, and a portion of the learner segments overlap with each other; for each of the coach segments, performing a dynamic time warping algorithm according to the coach segment and the corresponding learner segments to obtain a learner segment having a smallest error and to calculate an exercise score; and displaying the exercise score.

7 Claims, 7 Drawing Sheets

(56) References Cited

U.S. PATENT DOCUMENTS

| | | | | |
|---|---|---|---|---|
| 2009/0142029 | A1* | 6/2009 | Lin | G06T 13/40 |
| | | | | 386/278 |
| 2011/0160795 | A1* | 6/2011 | Osorio | A61N 1/36146 |
| | | | | 607/45 |
| 2011/0178615 | A1 | 7/2011 | Serra Julia | |
| 2015/0072797 | A1* | 3/2015 | Sakyo | G06K 9/00342 |
| | | | | 473/223 |
| 2015/0257682 | A1* | 9/2015 | Hansen | G16H 20/30 |
| | | | | 382/103 |
| 2016/0055316 | A1* | 2/2016 | Jafari | G16H 20/10 |
| | | | | 340/573.1 |
| 2016/0067136 | A1* | 3/2016 | Raghavan | G09B 19/003 |
| | | | | 601/40 |
| 2016/0313174 | A1* | 10/2016 | Lightstone | A43B 17/006 |
| 2017/0103672 | A1* | 4/2017 | Dey | G06F 3/0304 |
| 2017/0263147 | A1* | 9/2017 | King | G11B 27/026 |
| 2017/0368413 | A1* | 12/2017 | Shavit | G06K 9/00342 |

FOREIGN PATENT DOCUMENTS

| | | |
|---|---|---|
| CN | 105849671 A | 8/2016 |
| TW | I267806 B | 12/2006 |
| TW | I464696 B | 12/2014 |

OTHER PUBLICATIONS

Zhang, J. (Feb. 14, 2020). Dynamic Time Warping. Retrieved from https://towardsdatascience.com/dynamic-time-warping-3933f25fcdd (Year: 2020).*

Szabo, F. (2015). The linear algebra survival guide illustrated with mathematica. Amsterdam: Elsevier. p. 219 (Year: 2014).*

* cited by examiner

SCORING METHOD, EXERCISE SYSTEM, AND NON-TRANSITORY COMPUTER READABLE STORAGE MEDIUM

RELATED APPLICATIONS

This application claims priority to Taiwan Application Serial Number 107105046 filed Feb. 12, 2018, which is herein incorporated by reference.

BACKGROUND

Field of Invention

The present invention relates to a scoring method. More particularly, the present invention relates to a method for scoring an exercise course by an acceleration sensor.

Description of Related Art

With the rise of fitness in recent years, more and more people are willing to try to establish their own exercise habits. In today's information-rich environment, many people search for fitness-related instructional videos through resources such as the Internet, and imitate the movements in the videos to exercise. However, since a person generally does not have the ability to perform the required action correctly by imitation, he or she may be injured by doing the wrong action before the exercise effect is achieved. In addition, in the absence of a couch to assist in the assessment, the person does not know whether he has gradually improved during the exercise, so he may not be willing to continue exercising due to lack of accomplishment.

A common motion assessing system uses a multi-lens photographing device with computer vision technology to analysis the users motion posture, but this system costs a lot with respect to hardware or the production of digital content, causing difficulty in promotion. A common way is to use a wearable inertial sensor which includes an accelerometer and a magnetometer to record the acceleration and angular velocity of the sensor in three-dimensional space during motion. Thus, the motion trajectory in space can be calculated, analyzed, and compared. Another way is to use a worn accelerometer to simply record the change of the acceleration of the device during movement. In such system, data sample timing is an important reference, and thus is mainly applied to motion sampling, recording, and comparison analysis of segments, but is difficult to apply to calculate the action similarity between continuous motion actions.

SUMMARY

Embodiments of the disclosure provide a scoring method for an exercise system including a wearable acceleration sensor. The scoring method includes: playing a course video and obtaining coach exercise data corresponding to the course video, in which the coach exercise data includes multiple coach sample points, and each of the coach sample points includes multiple acceleration values; obtaining learner exercise data by the wearable acceleration sensor, in which the learner exercise data includes multiple learner sample points, and each of the learner sample points includes multiple acceleration values; splitting the coach exercise data into multiple coach segments, in which each of the coach segments corresponds to multiple learner segments of the learner exercise data, and a portion of the learner segments overlap with each other; for each of the coach segments, performing a dynamic time warping algorithm according to the coach segment and the corresponding learner segments to obtain a learner segment having a smallest error and to calculate an exercise score; and displaying the exercise score.

In some embodiments, the scoring method further includes: for each of the coach segments, obtaining a first sample point backward and obtaining a second sample point forward according to a time code of the coach segment; and sampling the learner exercise data by a first sample interval from the first sample point to the second sample point to obtain the learner segments.

In some embodiments, the scoring method includes: obtaining a first learner segment and a second learner segment that have smallest two errors; sampling the learner exercise data by a second sample interval from the first learner segment to the second learner segment to obtain at least one third learner segment, in which the second sample interval is shorter than the first sample interval; and performing the dynamic time warping algorithm according to one of the coach segments and the at least one third learner segment.

In some embodiments, the scoring method further includes: setting one of the first learner segment and the second learner segment that has a smaller error to be the learner segment having the smallest error if an error of the at least one third learner segment is greater than that of the first learner segment and the second learner segment.

In some embodiments, the step of performing the dynamic time warping algorithm according to the coach segment and the corresponding learner segments includes: calculating an error between one of the coach sample points and one of the learner sample points according to the following equation (1).

$$\text{error}_{i,j} = c_1 \times |x_i - y_j| + c_2 \times |(x_{i+1} - x_j) - (y_{j+1} - y_j)| + c_3 \times |(x_i - x_{i-1}) - (y_j - y_{j-1})| \quad (1)$$

$x_i$ denotes an $i^{th}$ coach sample point, $y_j$ denotes a $i^{th}$ learner sample point, $\text{error}_{i,j}$ denotes the error, and $c_1$, $c_2$, $c_3$ are real numbers.

In some embodiments, the process of calculating the exercise score includes: calculating the exercise score according to the following equation (2).

$$s_i = \frac{l}{\text{path}_i} \times p_i \quad (2)$$

$s_i$ denotes the exercise score corresponding to an $i^{th}$ coach segment, l denotes a length of the $i^{th}$ coach segment, $\text{path}_i$ denotes a length of a warping path between the $i^{th}$ coach segment and the learner segment having the smallest error, $p_i$ denotes a real number which is in negative correlation with a time shift between the $i^{th}$ coach segment and the learner segment having the smallest error.

In some embodiments, the process of calculating the exercise score includes further includes: calculating the exercise score according to the following equations (3) and (4).

$$s_i = \left(1 - \frac{\text{cost}_i}{l}\right) \times p_i \quad (3)$$

-continued $$cost_i = \sum_{j=1}^{K} c_j \text{ where } \begin{cases} c_j = 1 \text{ if } w_j > T \\ c_j = 0 \text{ if } w_j \leq T \end{cases} \quad (4)$$

$s_i$ denotes the exercise score corresponding to an $i^{th}$ coach segment, l denotes a length of the $i^{th}$ coach segment, $p_i$ denotes a real number which is in negative correlation with a time shift between the $i^{th}$ coach segment and the learner segment having the smallest error, $w_j$ denotes an error corresponding to a $j^{th}$ element of a warping path between the $i^{th}$ coach segment and the learner segment having the smallest error, T denotes a threshold, K is a length of the warping path.

In some embodiments, the acceleration values of each of the learner sample points includes an X-axis acceleration, a Y-axis acceleration, and a Z-axis acceleration. The scoring method further includes: changing a sign of the X-axis acceleration or the Y-axis acceleration, and re-performing a process of obtaining the learner segment having the smallest error, and displaying the exercise score which has a smaller error among the performing and re-performing the process of obtaining the learner segment having the smallest error.

In some embodiments, the step of displaying the exercise score includes: obtaining multiple consecutive first coach segments from the coach segments, and obtaining a first exercise score for each of the first coach segments; and displaying a maximum value among the first exercise scores.

From another aspect, embodiments of the disclosure provide an exercise system including a wearable acceleration sensor and a smart device. The smart device plays a course video and obtains coach exercise data corresponding to the course video through a display. The coach exercise data includes multiple coach sample points, and each of the coach sample points includes multiple acceleration values. The smart device obtains learner exercise data by the wearable acceleration sensor, in which the learner exercise data includes multiple learner sample points, and each of the learner sample points includes multiple acceleration values. The smart device splits the coach exercise data into multiple coach segments or transmits the learner exercise data and the coach exercise data to a server for splitting the coach exercise data into the coach segments, in which each of the coach segments corresponds to multiple learner segments of the learner exercise data, and a portion of the learner segments overlap with each other. For each of the coach segments, the smart device or the server performs a dynamic time warping algorithm according to the coach segment and the corresponding learner segments to obtain a learner segment having a smallest error, and to calculate an exercise score. The smart device displays the exercise score.

From another aspect, embodiments of the disclosure provide a non-transitory computer readable storage medium storing multiple instructions that are configured to be executed to perform steps of: playing a course video and obtaining coach exercise data corresponding to the course video, in which the coach exercise data includes multiple coach sample points, and each of the coach sample points includes multiple acceleration values; obtaining learner exercise data by a wearable acceleration sensor, in which the learner exercise data includes multiple learner sample points, and each of the learner sample points includes multiple acceleration values; splitting the coach exercise data into multiple coach segments, in which each of the coach segments corresponds to multiple learner segments of the learner exercise data, and a portion of the learner segments overlap with each other; for each of the coach segments, performing a dynamic time warping algorithm according to the coach segment and the corresponding learner segments to obtain a learner segment having a smallest error and to calculate an exercise score; and displaying the exercise score.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

A combination of a smart device and a cloud application service is provided in a scoring method for an exercise course, in which when a learner exercises according to an exercise course video, movement data of several body portions of the learner is extracted. The movement data is compared with movement data of a coach with respect to the body portions so as to assess the exercise result of the learner. Accordingly, the learner can know whether he is exercising correctly to improve the exercise effect and the willingness to exercise.

Figure 1A:
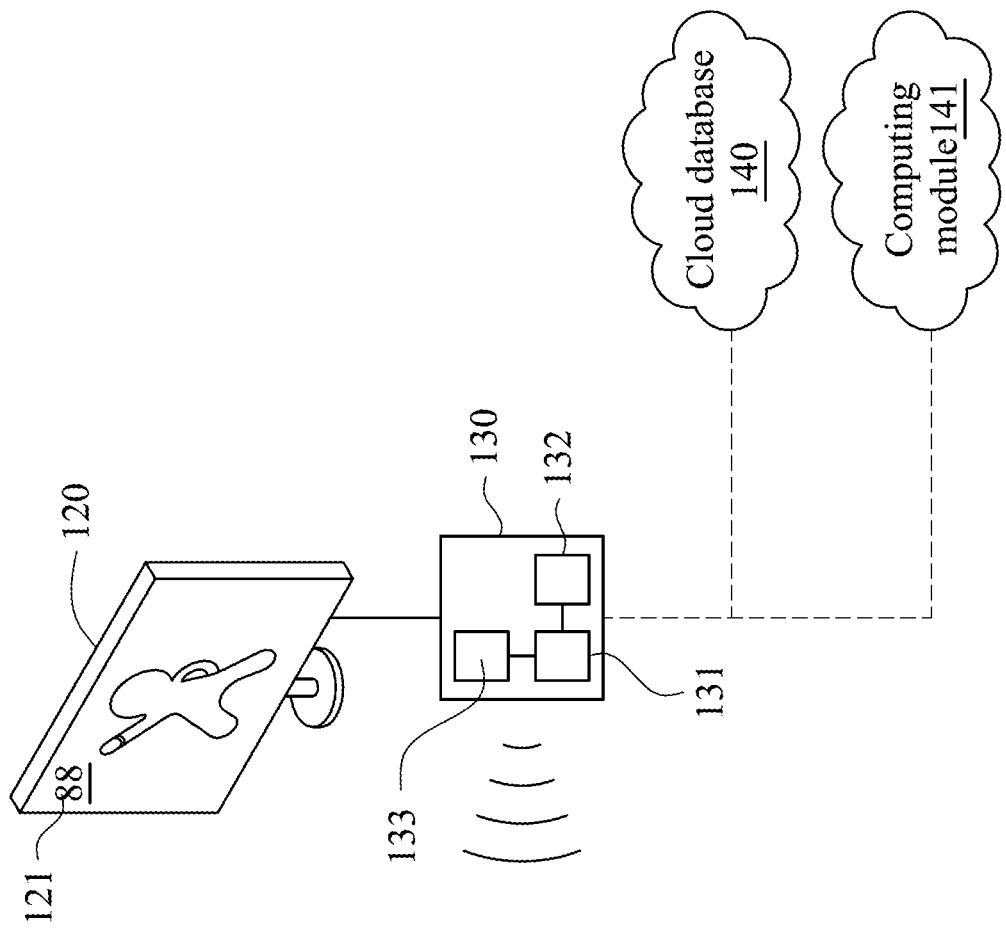
FIG. 1A is a schematic diagram illustrating an exercise system in accordance with an embodiment.
Figure 1A:
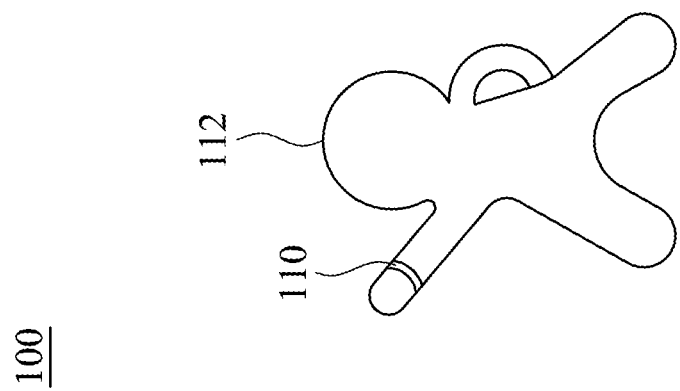

FIG. 1A is a schematic diagram illustrating an exercise system in accordance with an embodiment. Referring to FIG. 1A, an exercise system 100 includes at least one wearable acceleration sensor 110, a display 120, and a smart device 130.

The wearable acceleration sensor 110 is, for example, a sports bracelet worn by a learner 112. However, the wearable acceleration sensor 110 may also be a watch, a belt, or any device that can be worn by a user. The wearable acceleration sensor 110 includes a triaxial gravity sensor for sensing an X-axis acceleration value, a Y-axis acceleration value, and a Z-axis acceleration value. The wearable acceleration sensor 110 may also include a wireless communication module such as Bluetooth module, a wireless fidelity (WiFi) module or any other suitable low power wireless communication module. In some embodiments, the wearable acceleration sensor 110 also includes a display panel and some other units that is not limited in the invention. The display 120 displays a course video in which a coach is demonstrating actions.

The smart device 130 includes a processor 131, a memory 132, and a wireless communication module 133. The memory 132 stores instructions which are executed by the processor 131. The processor 131 is, for example, a central processing unit, a microprocessor, a microcontroller, a digital signal processor, an image processing chip, an application-specific integrated circuit which is not limited in the invention. The wireless communication module 133 is, for example, a Bluetooth module, a WiFi module or any other suitable low power wireless communication module for receiving the acceleration values from the wearable acceleration sensor 110.

Figure 1B:
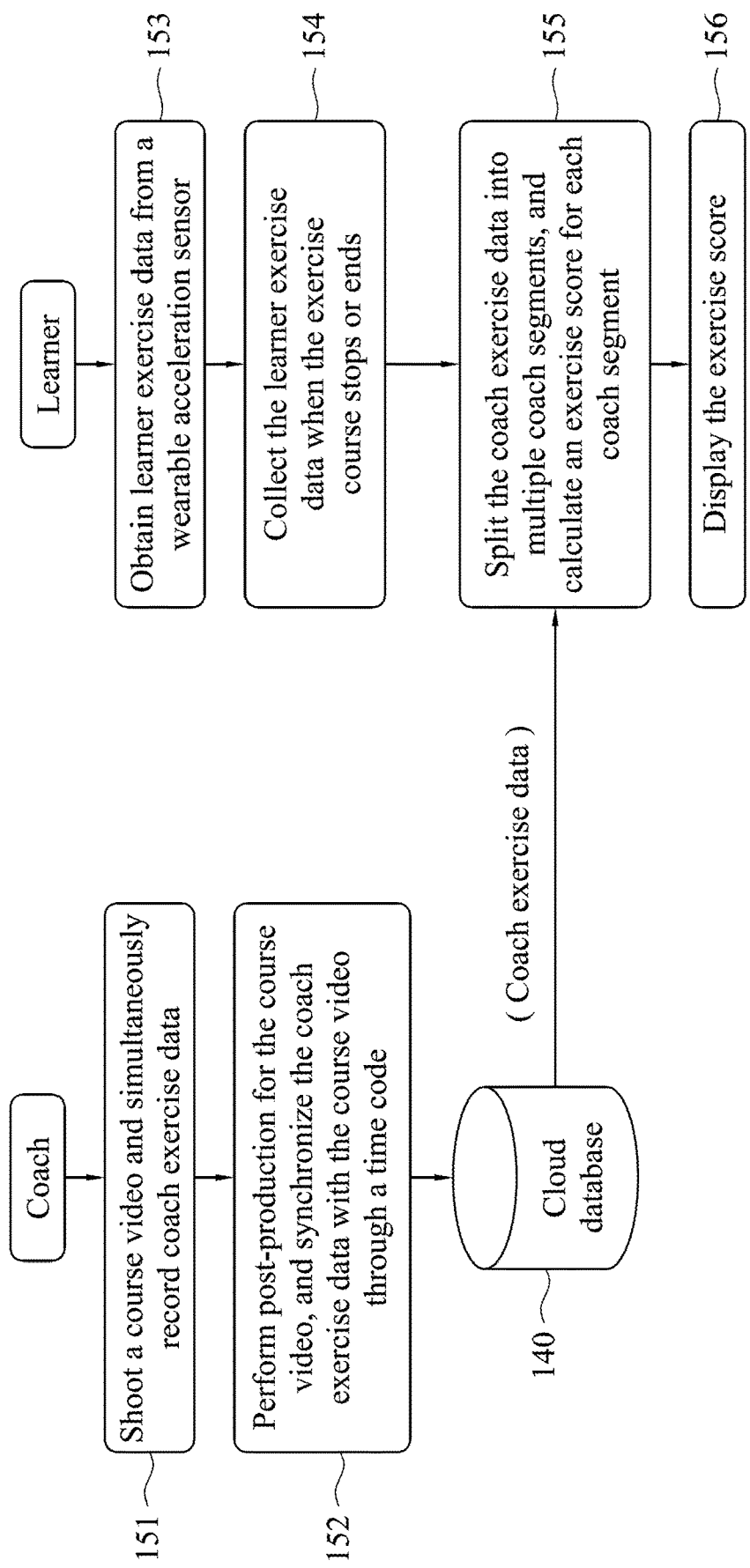
FIG. 1B is a flow chart for the exercise system in accordance with an embodiment.

FIG. 1B is a flow chart for the exercise system 100 in accordance with an embodiment. Referring to FIG. 1A and FIG. 1B, a course video is shot and simultaneously coach exercise data is recorded in step 151. In some embodiments, a coach is shot by several cameras which are disposed at different locations with different shooting angles to generate several films that are used to generate the course video. In particular, during the shooting, the coach wears one or multiple wearable acceleration sensor 110, and the acceleration values sensed by the wearable acceleration sensor 110 are recorded as coach exercise data. In detail, the coach exercise data includes multiple coach sample points, and each coach sample point includes an X-axis acceleration value, a Y-axis acceleration value, and a Z-axis acceleration value.

In step 152, post-production for the course video is performed, in which the coach exercise data is synchronized with the course video through a time code such as the time code determined by Society of Motion Picture and Television Engineers (SMPTE), but any other format of time code may be adopted in another embodiment which is not limited in the invention. Accordingly, it can be known that each coach sample point corresponds to which clip of course video or which frame through the time code. For example, if a sample frequency of the wearable acceleration sensor 110 is 25 Hz, which is not limited, then the coach exercise data corresponding to a minute of video will have 60×25=1500 coach sample points. Next, the course video and the coach exercise data are stored in a cloud database 140.

When a user is about to exercise, the processor 131 obtains the course video and the coach exercise data form the cloud database 140, and plays the course video through the display 120. Meanwhile, in step 153, the processor 131 obtains learner exercise data from the wearable acceleration sensor 110 (e.g. by the wireless communication module). In detail, the learner exercise data includes multiple learner sample points, and each learner sample point includes multiple acceleration values. In some embodiments, the processor 131 obtains the acceleration values from the wearable acceleration sensor 110 before the course video is played, but some of these acceleration values will be discarded until the course video is played, and then the acceleration values are stored as the learner exercise data. As a result, the obtained learner exercise data completely corresponds to the course video. It can be known that each learner sample point corresponds to which frame of the course video.

In step 154, when the exercise course stops or ends (i.e. the course video ends), the learner exercise data is collected. Since the corresponding relationship between the learner exercise data and the course video is obtained in the step 153 and the corresponding relationship between the course video and the coach exercise data is obtained by the SMPTE time code, the corresponding learner exercise data and coach exercise data can be obtained according to a frame number of the course video. In other words, it can be known that each learner sample point corresponds to which coach sample point according to the frame number.

In step 155, the coach exercise data is split into multiple coach segments, and an exercise score of each coach segment is calculated. In step 156, an exercise score 121 is displayed, and consequently the learner 112 can be aware whether he or she is doing the movement correctly, resulting in improving the exercise effect and willingness to exercise. In some embodiments, the exercise scores are calculated by the processor 131, but in other embodiments, the exercise scores may be calculated by a server on the cloud or any other electric device. For example, in FIG. 1A, the smart device 130 may be connected to a computing module 141 such as a server, a virtual machine or a web application providing a computing service, which is not limited in the invention. The processor 131 would transmit the coach exercise data and learner exercise data to the computing module 141, and after the exercise scores are calculated by the computing module 141, they are transmitted back to the processor 131. The calculation of the exercise score will be described in detail below.

Figure 2:
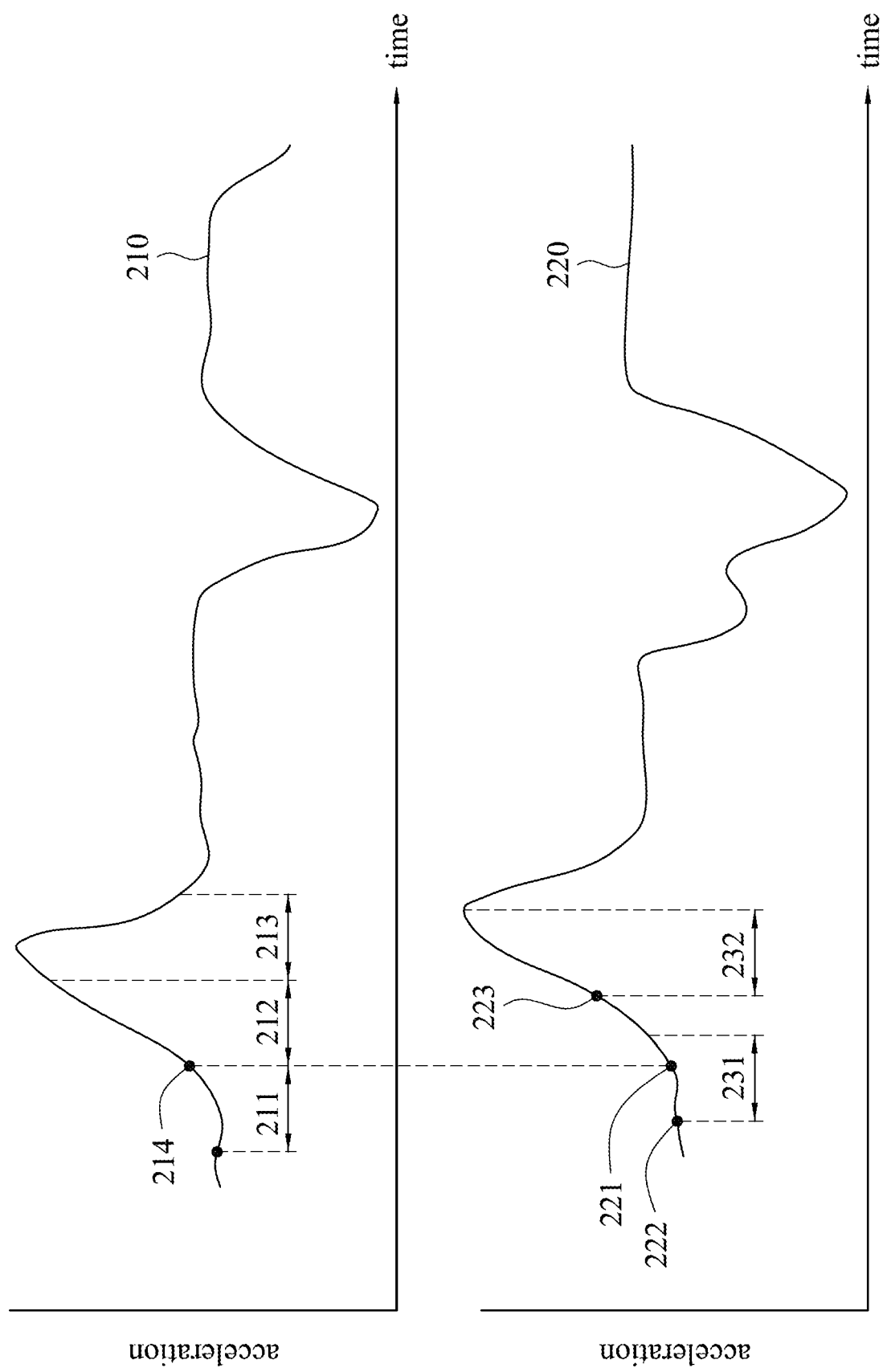
FIG. 2 is a schematic diagram illustrating coach exercise data and learner exercise data in accordance with an embodiment.

Referring to FIG. 2, FIG. 2 is a schematic diagram illustrating coach exercise data and learner exercise data in accordance with an embodiment. In FIG. 2, coach exercise data 210 and learner exercise data 220 is illustrated as signals with one dimension (i.e. each sample point has only one acceleration value), but this is only for illustration. In practical, each sample point has more than one acceleration values constituting a vector, and therefore the coach exercise data 210 and the learner exercise data 220 includes a set of vectors. In FIG. 2, the coach exercise data 210 and the learner exercise data 220 corresponds to the same course video, thus the calculated score should be high if the coach exercise data 210 is similar to the learner exercise data 220. Note that the length of the coach exercise data 210 may be different from that of the learner exercise data 220.

After the coach exercise data 210 and the learner exercise data 220 are obtained, the coach exercise data is split into multiple coach segments (e.g. coach segments 211-213). In some embodiments, the lengths of the coach segments 211-213 are equal to each other (e.g. 10 seconds), and therefore each coach segment may have 250 coach sample points if the sampling frequency is 25 Hz. However, in other embodiments, the lengths of the coach segments 211-213 may be different from each other. The lengths and the sampling frequency of the coach segments are not limited in the invention. The learner exercise data 220 also includes more than one learner segments. For each coach segment, a learner segment having a smallest error is searched within a time range to calculate a score. During searching the learner segment having the smallest error, each coach segment corresponds to more than one learner segments that have the same lengths as the length of the coach segment, and in particular, a portion of the learner segments overlap with each other. Take the coach segment 212 as an example, a start point of the coach segments 212 is at the sample point 214 which is synchronized with a sample point 221 of the learner exercise data 220. A sample point 222 (also referred to a first sample point) is obtained backward and a sample point 223 (also referred to a second sample point) is obtained forward according to the time code of the coach segment 212. The learner exercise data 220 is sampled from the sample point 222 to the sample point 223 by a sample interval (also referred to a first sample interval) to obtain multiple learner segment. For example, if the sample point 222 is 5 seconds before the coach segment 212, and the sample point 223 is 5 seconds after the coach segment 212, then there will be 2×5×25=250 sample points. If the sample interval is 10, then a total of 250/10=25 learner segments are sampled, in which the sample point 222 is the start point of a learner segment 231, and the sample point 223 is the start point of a learner segment 232. There are many other learner segments (not shown) between the learner segment 231 and the learner segment 232, and a portion of these learner segments overlap with each other.

Figure 3:
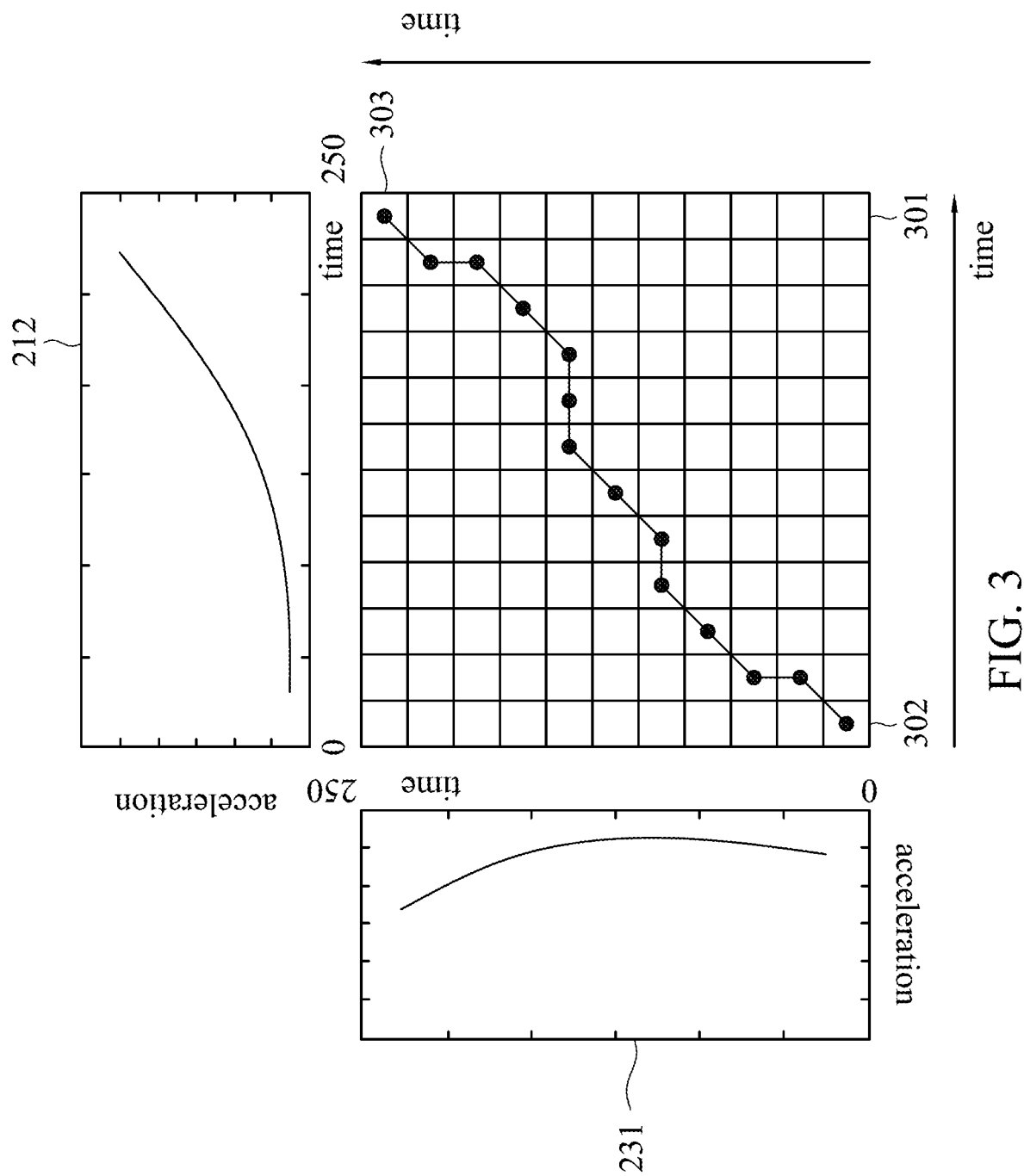
FIG. 3 is a schematic diagram illustrating finding a path in a dynamic time warping algorithm in accordance with an embodiment.

Next, a dynamic time warping algorithm is performed according to the coach segment 212 and each of the corresponding learner segments in order to determine an error or a similarity between the coach segment and the learner segment. The dynamic time warping algorithm is described herein. FIG. 3 is a schematic diagram illustrating finding a path in a dynamic time warping algorithm in accordance with an embodiment. Referring to FIG. 3, the coach segment 212 and the learner segment 231 are taken as an example, and both of them have the same length (including 250 sample points). A matrix 301 is created herein while the numbers of the columns and rows in the matrix 301 represents the numbers of the sample points in the coach segment 212 and in the learner segment 231 respectively. An element in an $i^{th}$ column and in a $i^{th}$ row of the matrix 301 represents an error between an $i^{th}$ coach sample point and a $j^{th}$ learner sample point. Assume $x_i$ denotes the $i^{th}$ coach sample point, and $y_j$ denotes the $j^{th}$ learner sample point where i and j are positive integers. $error_{i,j}$ denotes the error between the $i^{th}$ coach sample point and the $j^{th}$ learner sample point as the following equation (1).

$$error_{i,j}=c_1\times|x_i-y_j|+c_2\times|(x_{i+1}-x_j)-(y_{j+1}-y_j)|+c_3\times|(x_i-x_{i-1})-(y_j-y_{j-1})| \quad (1)$$

$c_1$, $c_2$, $c_3$ are real numbers that can be determined by experiments. Note that the term of $x_i-y_j$ is a vector, and $|x_i-y_j|$ represents the sum of absolute values of all elements in the vector $x_i-y_j$. In a conventional dynamic time warping algorithm, $error_{i,j}$ is the Euclidean Distance or sum of absolute difference between $x_i$ and $y_j$, but the terms of $|(x_{i+1}-x_j)-(y_{j+1}-y_j)|$ and $|(x_i-x_{i-1})-(y_j-y_{j-i})|$ are also included in the embodiment for representing a slop difference between two signals. For example, when $x_i$ is equal to $y_j$ while $x_i$ is increasing and $y_j$ is decreasing, a result of $error_{i,j}=0$ is obtained in the conventional algorithm, but $error_{i,j}$ would not be zero in the embodiment, and thus the characteristic of the signal is described more effectively.

The dynamic time warping algorithm is to find a warping path from a starting point 302 to an end 303 while the following equation (2) is complied.

$$\min_w \Sigma_{k=1}^{K} w_k \quad (2)$$

The vector w denotes the warping path. The positive integer K is the length of the vector w. An element $w_k=(i,j)$ of the vector w is the $error_{i,j}$ in the $i^{th}$ column and $j^{th}$ row of the matrix 301. However, people skilled in the art should be able to understand the dynamic time warping algorithm, and thus the detail will not be described herein. It can be appreciated that the warping path is a diagonal line with 45 degrees when the coach segment 212 is exactly identical to the learner segment 231, and this case would have the shortest length K; and the larger the difference between the coach segment 212 and the learner segment 231 is, the greater the length K is. In other words, the error between the coach segment 212 and the learner segment 231 is in a positive correlation with the length K which is used to search for a learner segment having the smallest error (e.g. the learner segment having the shortest length K).

Figure 4:
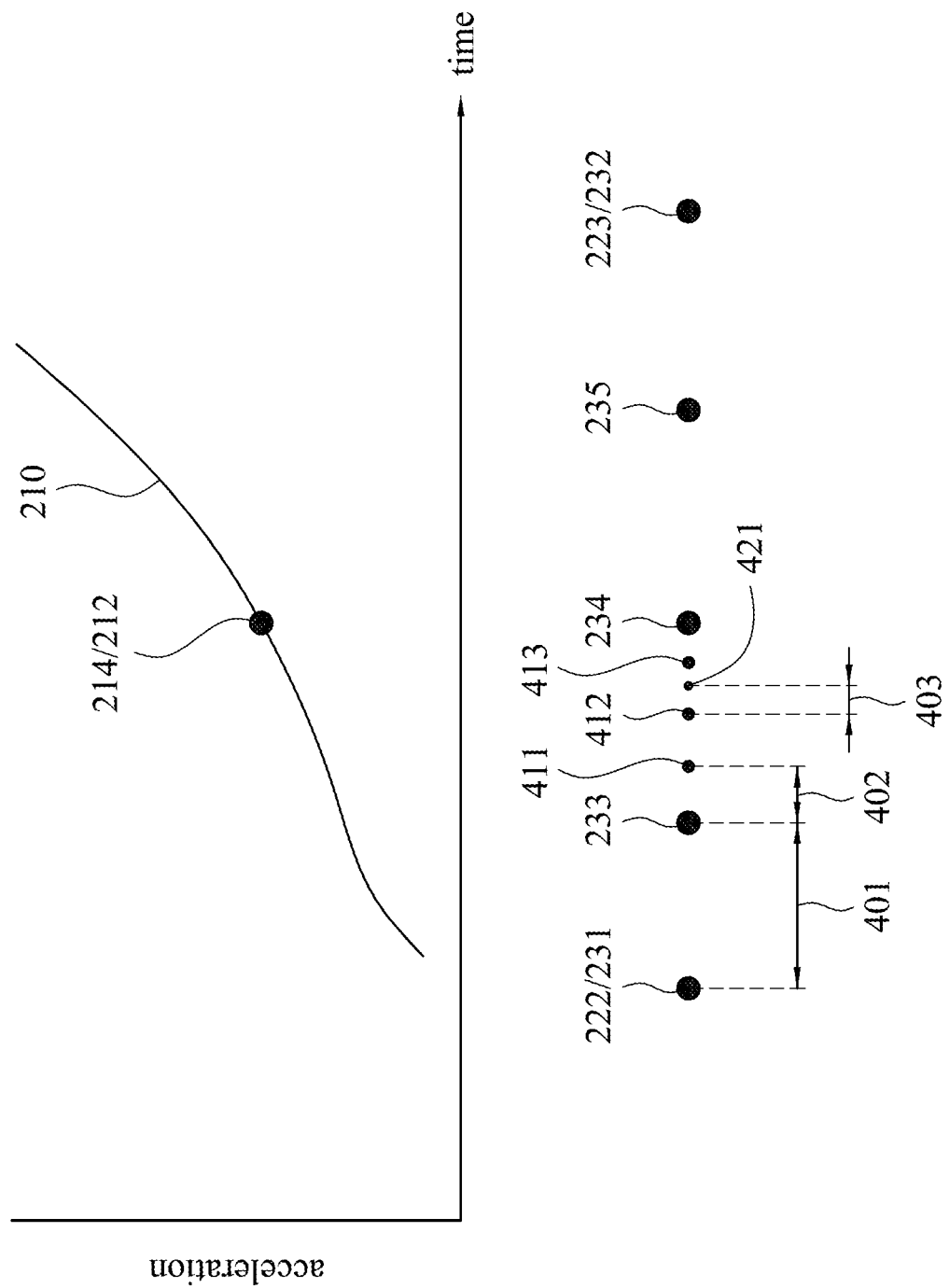
FIG. 4 is a schematic diagram illustrating searching for a learner segment having a smallest error in accordance with an embodiment.

FIG. 4 is a schematic diagram illustrating searching for a learner segment having a smallest error in accordance with an embodiment. Referring to FIG. 4, one coach segment is represented as a coach sample point, and one learner segment is represented as a learner sample point for simplification. In addition, the learner exercise data is not shown in FIG. 4. Assume that the coach segment 212 corresponds to the learner segments 231-235 during the first iteration of searching, and the learner segments 231-235 are spaced from each other by a sample interval 401 (e.g. 10 sample points). The dynamic time warping algorithm is performed for the coach segment 212 and each of the learner segments 231-235, and two learner segments that have the smallest two errors (i.e. shortest two lengths K) are obtained. For example, two learner segments 233, 234 (also referred to a first learner segment and a second learner segment respectively) are found. Next, the sample interval is reduced (e.g. from 10 to 5 sample points) for further searching, and the learner exercise data is sampled from the learner segment 233 to the learner segment 234 by the reduced sample interval 402 to obtain learner segments 411-413 (also referred to third learner segments). It is shown that the sample interval 402 is shorted than the sample interval 401. In other words, a methodology of "course to fine" is adopted in the embodiment in order to search the learner segment having the smallest error.

If the errors of the learner segments 411-413 are greater than that of the learner segments 233, 234, then one of the learner segments 233, 234 that has smaller error is set to be the learner segment having the smallest error, and the searching stops. If one of the learner segments 411-413 has the error smaller than that of the learner segments 233, 234, the methodology of "course to fine" continues, for example, two learner segments 412, 413 that have smallest two errors are obtained, and the sample interval is further reduced. The learner exercise data is sampled from the learner segment 412 to the learner segment according to the reduced sample interval 403 to obtain a learner segment 421. In some embodiments, if the sample interval 402 is less than a threshold (e.g. 2, 3 or other values), then the sample interval will not be reduced anymore, and the learner segment having the smallest error is selected from the current learner segments 411-413.

An exercise score is calculated for the coach segment 212 after the learner segment having the smallest error is found, and the exercise score is displayed on the display 120. In some embodiments, the exercise score is calculated according to the following equation (3).

$$s_i = \frac{l}{path_i} \times p_i \quad (3)$$

$s_i$ denotes an exercise score corresponding to an $i^{th}$ coach segment. l denotes the length of the coach segment. $path_i$ denotes the length of the warping path between the $i^{th}$ coach segment and the learner segment having the smallest error. For example, if the learner segment 412 has the smallest error, then $path_i$ is the length of the warping path between the coach segment 212 and the learner segment 412. $p_i$ is denotes a real number which is in negative correlation with a time shift between the $i^{th}$ coach segment and the learner segment having the smallest error. For example, there is a shift in time (e.g. a shift of 20 sample points) between the coach segment 212 and the learner segment 412. If the shift is large, it means the movement of the learner is similar to that of the coach but is done too early or too late, and thus the score is slightly decreased. In other words, if the learner segment 234 has the smallest error, it means there is no time shift and therefore no need to decrease the score. In some embodiments, the shift is inputted to a lookup table to obtain the real number $p_i$. For example, the real number $p_i$ is equal to 1 when the shift is less than 3, and is equal to 0.9 when the shift is in a range from 3 to 6, etc., but the content of the lookup table is not limited in the invention. In other embodiments, the shift is inputted to a function to obtain the real number $p_i$, which is not limited in the invention. In the embodiment, the exercise score is normalized into the range from 0 to 100. But another score range may be adopted in another embodiment, which is not limited in the invention.

In some embodiments, the exercise score is calculated according to the following equations (4) and (5).

$$s_i = \left(1 - \frac{cost_i}{l}\right) \times p_i \quad (4)$$

$$cost_i = \sum_{j=1}^{K} c_j \text{ where } \begin{cases} c_j = 1 \text{ if } w_j > T \\ c_j = 0 \text{ if } w_j \leq T \end{cases} \quad (5)$$

The definition of element $w_j$ has been described in the equation (2). In other words, whether the element $w_j$ is greater than a threshold T is determined for each element $w_j$. If the determination is affirmative, $cost_i$ increases in 1, otherwise increases in 0 where the threshold T may be determined by experiments which is not limited in the invention. The larger difference between the coach exercise data and the learner exercise data is, the greater the cost is, and thus leading to smaller exercise score $s_i$.

Figure 5:
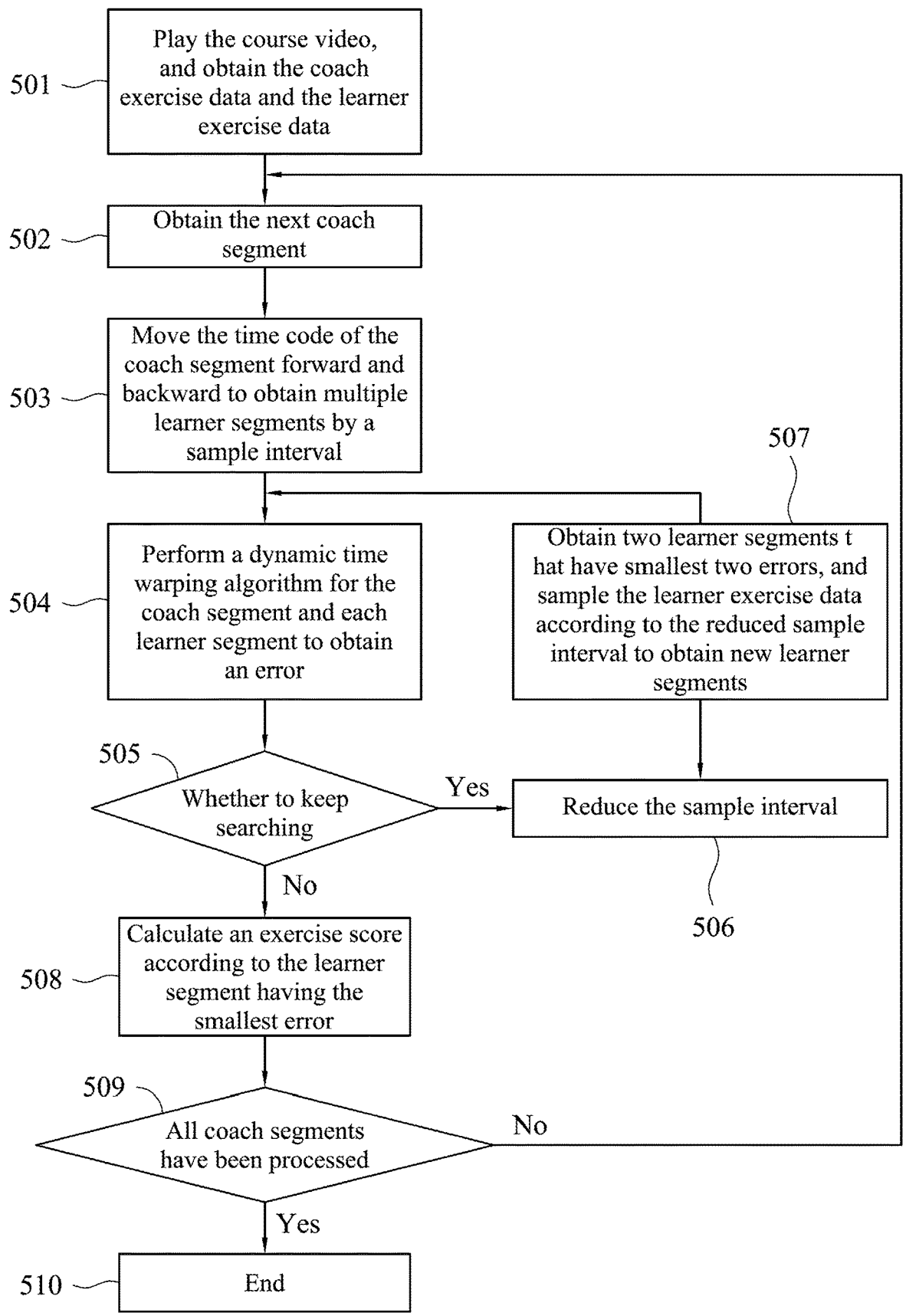
FIG. 5 is a flow chart of finding the learner segment having the smallest error in accordance with an embodiment.

The searching mechanism may be referred to FIG. 5, in step 501, the course video is played, and the coach exercise data and the learner exercise data is obtained. In step 502, a next coach segment is obtained in which the first coach segment is obtained if the step 502 is performed for the first time. In step 503, the time code of the coach segment is moved forward and backward, and multiple learner segments are obtained by a sample interval. In step 504, a dynamic time warping algorithm is performed for the coach segment and each learner segment to obtain an error.

In step 505, it is determined whether to keep searching. As mentioned above, the searching stops when the sample interval is less than a threshold or newly obtained learner segments do not have smaller errors. If it is determined to keep searching, in step 506, the sample interval is reduced. In step 507, two learner segments that have smallest two errors are obtained, and the learner exercise data is sampled according to the reduced sample interval to obtain new learner segments. If it is determined that the searching stops, in step 508, an exercise score is calculated according to the learner segment having the smallest error. In step 509, it is determined whether all coach segments have been processed, and the step 502 is performed again if the answer is affirmative, otherwise the method ends (step 510).

Note the time code of the coach segment is moved backward and forward in the step 503 for increasing flexibility because the movement of the learner may be too slow or too fast. On the other hand, two adjacent coach segments may correspond to two learning segments having the smallest error respectively that overlap with each other. These features are different from the conventional dynamic time warping algorithm.

Referring to FIG. 2, in some embodiments, multiple consecutive first coach segments are first obtained, the exercise score for each first coach segment is calculated, and then only the maximum value among the exercise scores of the first coach segments is displayed. For example, after the exercise scores for the coach segments 211-213 are calculated, only the maximum value of these three exercise scores is displayed to avoid the scores being too low, which hurts the confidence of the learner. In some embodiments, the mean value of multiple exercise scores is displayed, which is not limited in the invention.

Referring to FIG. 1A and FIG. 2, in some embodiments, the user may reverse the wearable acceleration sensor 110, and consequently the X and Y axes will rotate 180 degrees. In addition, when the learner mimics the coach's movements, there may be mirroring situations, such as the left hand of the learner to mimic the action of the right hand of the coach, or the left hand of the learner to mimic the action of the left hand of the coach. Therefore, when the wearing direction is combined with the mirroring situation, various possibilities are generated. For each case, the step of the searching for the learner segment having the smallest error can be performed, and the exercise score corresponding to the case of smallest error is displayed. Specifically, in the first case, the sign of X-axis acceleration and Y-axis acceleration do not change; in the second case, only the sign of X-axis acceleration changes without changing the sign of Y-axis acceleration; in the third case, only the sign of Y-axis acceleration changes without changing the sign of X-axis acceleration; in the fourth situation, both of the signs of X-axis acceleration and Y-axis acceleration change. For each case, the step of searching for the smallest error can be used, and the corresponding error can be obtained. If the error of a certain case is smaller than that of the other cases, the calculation result of that case is adopted, and the exercise score thereof is displayed. In some embodiments, only two or three of the above four cased are calculated, for example, only the second and third cases are calculated. However, how many and which cases are used is not limited in the invention. In some embodiments, all cases are calculated for each coach segment because when the learner mimics the coach's actions, sometimes with mirroring, sometimes without mirroring. Therefore, an appropriate exercise score may be obtained when all cases are calculated.

Figure 6:
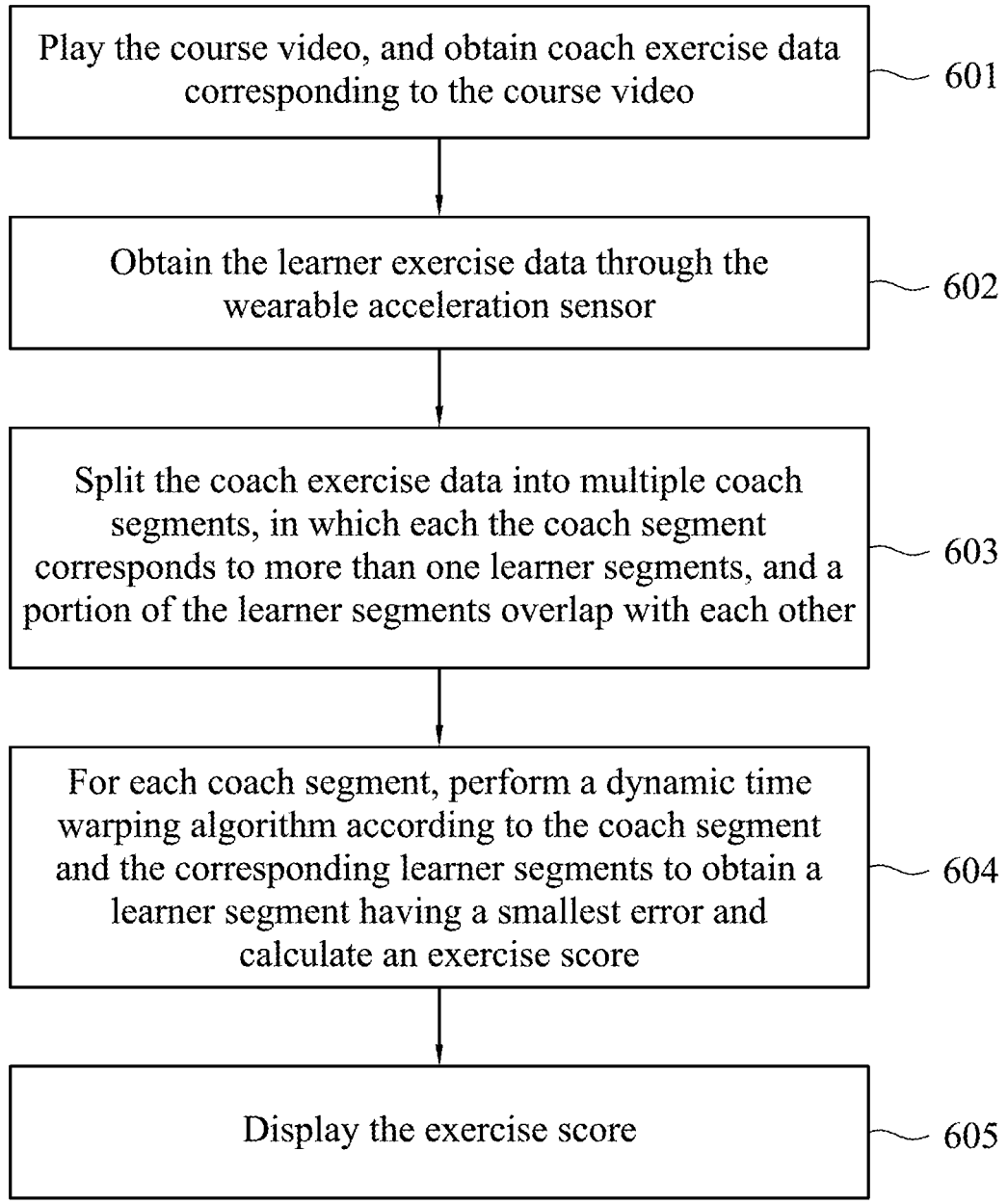
FIG. 6 is a flow chart of a scoring method in accordance with an embodiment.

FIG. 6 is a flow chart of a scoring method in accordance with an embodiment. Referring to FIG. 6, in step 601, the course video is played, and coach exercise data corresponding to the course video is obtained. In step 602, the learner exercise data is obtained through the wearable acceleration sensor. In step 603, the coach exercise data is split into multiple coach segments, in which each of the coach segments corresponds to more than one learner segments, and a portion of the learner segments overlap with each other. In step 604, for each coach segment, a dynamic time warping algorithm is performed according to the coach segment and the corresponding learner segments to obtain a learner segment having a smallest error and calculate an exercise score. In step 605, the exercise score is displayed.

However, all the steps in FIG. 6 have been described in detail above, and therefore they will not be repeated. Note that the steps in FIG. 6 can be implemented as program codes or circuits, and the disclosure is not limited thereto. In addition, the method in FIG. 6 can be performed with the aforementioned embodiments, or can be performed independently. In other words, other steps may be inserted between the steps of the FIG. 6. From another aspect, a non-transitory computer readable storage medium is provided. The non-transitory computer readable storage medium stores multiple instructions which are executed to perform the step of FIG. 6.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A scoring method for an exercise system comprising a wearable acceleration sensor, wherein the scoring method comprises:

capturing a course video of a coach performing an exercise utilizing at least one camera;

recording coach exercise data of the exercise performed by the coach utilizing a first acceleration sensor, wherein the first acceleration sensor has a first sampling frequency, the coach exercise data comprises coach sample points, a number of the coach sample points directly corresponds to the first sampling frequency, and each of the coach sample points comprises an X-axis acceleration value, a Y-axis acceleration value, and a Z-axis acceleration value;

synchronizing the coach exercise data with the course video using a time code of the course video in such a manner that each of the coach sample points corresponds to a particular frame of the course video;

storing the course video and the coach exercise data in a cloud database;

obtaining, by a processor of a smart device, the course video and the coach exercise data;

playing the course video through a display electrically coupled to the smart device;

obtaining learner exercise data utilizing a second acceleration sensor meanwhile with the playing of the course video, wherein the second acceleration sensor has a second sampling frequency, the learner exercise data comprises learner sample points, a number of the learner sample points directly corresponds to the second sampling frequency, and each of the learner sample points comprises an X-axis acceleration value, a Y-axis acceleration value, and a Z-axis acceleration value, wherein the learner exercise data corresponds directly to the course video, and the learner sample points are synchronized with the course video;

splitting the coach exercise data into a plurality of coach segments, for each of the coach segments, obtaining a first sample point before a start point of the coach segment and obtaining a second sample point after the start point of the coach segment according to a time code of the coach segment, and sampling the learner exercise data by a first sample interval from the first sample point to the second sample point to obtain a plurality of learner segments, wherein a portion of the learner segments overlap with each other;

for each of the coach segments, performing a dynamic time warping algorithm according to the coach segment and the corresponding learner segments to obtain an error of each of the corresponding learner segments, and obtaining a first learner segment and a second learner segment of the corresponding learner segments that have two smallest errors, sampling the learner exercise data by a second sample interval from the first learner segment to the second learner segment to obtain a plurality of third learner segments, wherein the second sample interval is shorter than the first sample interval;

for each of the coach segments, performing the dynamic time warping algorithm according to the coach segment and the corresponding third learner segments to obtain an error of each of the corresponding third learner segments, and obtaining one of the third learner segment having a smallest error;

for each of the coach segments, calculating an exercise score according to the coach segment and corresponding one of the learner segments having the smallest error; and displaying the exercise score through the display, wherein the step of performing the dynamic time warping algorithm according to the coach segment and the corresponding learner segments comprises:

calculating an error between one of the coach sample points and one of the learner sample points according to a following equation (1):

$$\text{error}_{i,j} = c_1 \times |x_i - y_j| + c_2 \times |(x_{i+1} - x_j) - (y_{j+1} - y_j)| + c_3 \times |(x_i - x_{i-1}) - (y_j - y_{j-1})| \quad (1),$$

wherein $x_i$ denotes an $i^{th}$ coach sample point, $y_j$ denotes a $j^{th}$ learner sample point, $\text{error}_{i,j}$ denotes the error between the $i^{th}$ coach sample point and the $j^{th}$ learner sample point, and $c_1$, $c_2$, $c_3$ are real numbers.

2. The scoring method of claim 1, wherein the calculating the exercise score comprises:

calculating the exercise score according to a following equation (2):

$$s_i = \frac{l}{path_i} \times p_i, \quad (2)$$

wherein $s_i$ denotes the exercise score corresponding to an $i^{th}$ coach segment, l denotes a length of the $i^{th}$ coach segment, $path_i$ denotes a length of a warping path between the $i^{th}$ coach segment and the learner segment having the smallest error, $p_i$ denotes a real number which is in negative correlation with a time shift between the $i^{th}$ coach segment and the learner segment having the smallest error.

3. The scoring method of claim 1, wherein the calculating the exercise score comprises further comprises:

calculating the exercise score according to following equations (2) and (3):

$$s_i = \left(1 - \frac{cost_i}{l}\right) \times p_i \quad (2)$$

-continued $$cost_i = \sum_{j=1}^{K} c_j \text{ where } \begin{cases} c_j = 1 \text{ if } w_j > T \\ c_j = 0 \text{ if } w_j \leq T \end{cases} \quad (3)$$

wherein $s_i$ denotes the exercise score corresponding to an $i^{th}$ coach segment, 1 denotes a length of the $i^{th}$ coach segment, $p_i$ denotes a real number which is in negative correlation with a time shift between the $i^{th}$ coach segment and the learner segment having the smallest error, $w_1$ denotes an error corresponding to a $j^{th}$ element of a warping path between the $i^{th}$ coach segment and the learner segment having the smallest error, T denotes a threshold, K is a length of the warping path.

4. The scoring method of claim 1, wherein the scoring method further comprises:
changing a sign of the X-axis acceleration or the Y-axis acceleration of each of the learner sample points, and re-performing a process of obtaining the learner segment having the smallest error, and displaying the exercise score which has a smaller error among the performing and re-performing the process of obtaining the learner segment having the smallest error.

5. The scoring method of claim 1, wherein the step of displaying the exercise score comprises:
obtaining a plurality of consecutive first coach segments from the coach segments, and obtaining a first exercise score for each of the first coach segments; and
displaying a maximum value among the first exercise scores.

6. An exercise system comprising:
a server, configured to capture a course video of a coach performing an exercise utilizing at least one camera, record coach exercise data of the exercise performed by the coach utilizing a first acceleration sensor, wherein the first acceleration sensor has a first sampling frequency, the coach exercise data comprises coach sample points, a number of the coach sample points directly corresponds to the first sampling frequency, and each of the coach sample points comprises an X-axis acceleration value, a Y-axis acceleration value, and a Z-axis acceleration value, the server is further configured to synchronize the coach exercise data with the course video using a time code of the course video in such a manner that each of the coach sample points corresponds to a particular frame of the course video, and store the course video and the coach exercise data in a cloud database;
a wearable acceleration sensor;
a display; and
a smart device electrically coupled to the display, the smart device being configured to obtain the course video and the coach exercise data, and play the course video through the display,
wherein the smart device obtains learner exercise data by the wearable acceleration sensor, wherein the wearable acceleration sensor has a second sampling frequency, the learner exercise data comprises learner sample points, a number of the learner sample points directly corresponds to the second sampling frequency, and each of the learner sample points comprises an X-axis acceleration value, a Y-axis acceleration value, and a Z-axis acceleration value, wherein the learner exercise data corresponds directly to the course video, and the learner sample points are synchronized with the course video,
wherein the smart device or the server is configured to perform steps of:
splitting the coach exercise data into a plurality of coach segments, for each of the coach segments, obtaining a first sample point before a start point of the coach segment and obtaining a second sample point after the start point of the coach segment according to a time code of the coach segment, and sampling the learner exercise data by a first sample interval from the first sample point to the second sample point to obtain a plurality of learner segments, wherein a portion of the learner segments overlap with each other;
for each of the coach segments, performing a dynamic time warping algorithm according to the coach segment and the corresponding learner segments to obtain an error of each of the corresponding learner segments, and obtaining a first learner segment and a second learner segment of the corresponding learner segments that have two smallest errors, sampling the learner exercise data by a second sample interval from the first learner segment to the second learner segment to obtain a plurality of third learner segments, wherein the second sample interval is shorter than the first sample interval;
for each of the coach segments, performing the dynamic time warping algorithm according to the coach segment and the corresponding third learner segments to obtain an error of each of the corresponding third learner segments, and obtaining one of the third learner segment having a smallest error; and
for each of the coach segments, calculating an exercise score according to the coach segment and corresponding one of the learner segments having the smallest error,
wherein the smart device is further configured to display the exercise score through the display,
wherein the step of performing the dynamic time warping algorithm according to the coach segment and the corresponding learner segments comprises:
calculating an error between one of the coach sample points and one of the learner sample points according to a following equation (1):

$$\text{error}_{i,j} = c_1 \times |x_i - y_j| + c_2 \times |(x_{i+1} - x_j) - (y_{j+1} - y_j)| + c_3 \times |(x_i - x_{i-1}) - (y_j - y_{j-1})| \quad (1),$$

wherein $x_i$ denotes an $i^{th}$ coach sample point, $y_j$ denotes a $j^{th}$ learner sample point, $\text{error}_{i,j}$ denotes the error between the $i^{th}$ coach sample point and the $j^{th}$ learner sample point, and $c_1$, $c_2$, $c_3$ are real numbers.

7. A scoring method for an exercise system comprising a wearable acceleration sensor, wherein the scoring method comprises:
capturing a course video of a coach performing an exercise utilizing at least one camera;
recording coach exercise data of the exercise performed by the coach utilizing a first acceleration sensor, wherein the first acceleration sensor has a first sampling frequency, the coach exercise data comprises coach sample points, a number of the coach sample points directly corresponds to the first sampling frequency, and each of the coach sample points comprises an X-axis acceleration value, a Y-axis acceleration value, and a Z-axis acceleration value;

synchronizing the coach exercise data with the course video using a time code of the course video in such a manner that each of the coach sample points corresponds to a particular frame of the course video;

storing the course video and the coach exercise data in a cloud database;

obtaining, by a processor of a smart device, the course video and the coach exercise data;

playing the course video through a display electrically coupled to the smart device;

obtaining learner exercise data utilizing a second acceleration sensor meanwhile with the playing of the course video, wherein the second acceleration sensor has a second sampling frequency, the learner exercise data comprises learner sample points, a number of the learner sample points directly corresponds to the second sampling frequency, and each of the learner sample points comprises an X-axis acceleration value, a Y-axis acceleration value, and a Z-axis acceleration value, wherein the learner exercise data corresponds directly to the course video, and the learner sample points are synchronized with the course video;

splitting the coach exercise data into a plurality of coach segments, for each of the coach segments, obtaining a first sample point before a start point of the coach segment and obtaining a second sample point after the start point of the coach segment according to a time code of the coach segment, and sampling the learner exercise data by a first sample interval from the first sample point to the second sample point to obtain a plurality of learner segments, wherein a portion of the learner segments overlap with each other;

for each of the coach segments, performing a dynamic time warping algorithm according to the coach segment and the corresponding learner segments to obtain an error of each of the corresponding learner segments, wherein the error of each of the corresponding learner segments is a sum of errors of a warping path determined by the dynamic time warping algorithm, and each error of the warping path is calculated based on a following equation (1):

$$\text{error}_{i,j} = c_1 \times |x_i - y_j| + c_2 \times |(x_{i+1} - x_j) - (y_{j+1} - y_j)| + c_3 \times |(x_i - x_{i-1}) - (y_j - y_{j-1})| \quad (1),$$

wherein $x_i$ denotes an $i^{th}$ coach sample point of the coach exercise data, $y_j$ denotes a $j^{th}$ learner sample point of the learner exercise data, $\text{error}_{i,j}$ denotes one of the errors of the warping path, and $c_1$, $c_2$, $c_3$ are real numbers;

obtaining one of the learner segments having a smallest error;

for each of the coach segments, calculating an exercise score according to the coach segment and corresponding one of the learner segments having the smallest error based on a following equation (2):

$$s_i = \frac{l}{path_i} \times p_i, \quad (2)$$

wherein $s_i$ denotes the exercise score corresponding to an $i^{th}$ coach segment, l denotes a length of the $i^{th}$ coach segment, $path_i$ denotes a length of the warping path between the $i^{th}$ coach segment and the corresponding learner segment having the smallest error, $p_i$ denotes a real number which is in negative correlation with a time shift between the $i^{th}$ coach segment and the learner segment having the smallest error; and displaying the exercise scores through the display.

\* \* \* \* \*